(12) United States Patent
Ren et al.

(10) Patent No.: US 8,321,434 B1
(45) Date of Patent: Nov. 27, 2012

(54) TWO TIERED ARCHITECTURE OF NAMED ENTITY RECOGNITION ENGINE

(75) Inventors: Liwei Ren, Sunnyvale, CA (US); Shu Huang, San Jose, CA (US)

(73) Assignee: Trend Micro Incorporated, Tokyo (JP)

(*) Notice: Subject to any disclaimer, the term of this patent is extended or adjusted under 35 U.S.C. 154(b) by 305 days.

(21) Appl. No.: 11/833,932

(22) Filed: Aug. 3, 2007

Related U.S. Application Data

(60) Provisional application No. 60/822,510, filed on Aug. 15, 2006.

(51) Int. Cl.
*G06F 7/00* (2006.01)
(52) U.S. Cl. ........ 707/755; 707/602; 707/673; 707/675; 707/711; 704/7; 704/9; 726/26
(58) Field of Classification Search .................. 707/673, 707/675, 602, 711, 755; 704/7, 9; 726/26
See application file for complete search history.

(56) References Cited

U.S. PATENT DOCUMENTS

| | | | | |
|---|---|---|---|---|
| 5,410,475 A | * | 4/1995 | Lu et al. | 704/1 |
| 6,667,700 B1 | * | 12/2003 | McCanne et al. | 341/51 |
| 2004/0128552 A1 | * | 7/2004 | Toomey | 713/201 |
| 2005/0005145 A1 | * | 1/2005 | Teixeira | 713/193 |

* cited by examiner

*Primary Examiner* — Cheyne Ly
(74) *Attorney, Agent, or Firm* — Okamoto & Benedicto LLP

(57) ABSTRACT

A system (and a method) is disclosed to extract entity values from texts. The system receives, at a first tier entity recognition engine, an input data string having a plurality of entities. The first tier entity recognition engine marks entities of the plurality of entities that are regular expression and transmits the input data stream with the marked entities to a second tier entity recognition engine. The second tier entity recognition engine receives the input data stream and identifies unmarked entities in the input data stream received at the second tier entity recognition engine. The second tier entity recognition engine determines whether the unmarked entities comprise a predetermined data format, and if so, outputs those unmarked entities of the plurality of entities that comprise the predetermined data format.

15 Claims, 10 Drawing Sheets

TWO TIERED ARCHITECTURE OF NAMED ENTITY RECOGNITION ENGINE

CROSS REFERENCE TO RELATED APPLICATIONS

This application claims the benefit of U.S. Provisional Application No. 60/822,510, filed Aug. 15, 2006, titled "Two-Tier Architecture of Named Entity Recognition Engine that Couples Advanced Regular Expression Techniques and Entity Record Fingerprinting Algorithms," which is incorporated by reference in its entirety.

BACKGROUND

1. Field of Art

This disclosure relates generally to the field of information extraction (IE) technologies and specifically to the field of named entity recognition (NER) for extracting entity values from texts, with applications to the information leakage prevention and detection systems.

2. Description of the Related Art

In general, named entity recognition is a task of information extraction that seeks to identify and classify atomic elements in texts into pre-defined categories such as the personal names, personal identification (such as SSN), organizations, address, email address, account number, phone number, credit card number, date, time expression, monetary values, etc. One usually refers to these pre-defined data categories as named entities, or entities for short.

Presently, there are shortcomings of known named entity recognition technologies. For example, present capabilities of existing named entity recognition technologies are insufficient to address query problems such as the one that follows by example. At the outset, assumptions are made that (1) entities are pre-defined; (2) millions of instances of these pre-defined entities are stored in the database system or other data storage space such as MS Excel; and (3) multiple entities are relevant and their instances can be presented in a tabular format much like data records. Thereafter, for any given text current named entity recognition technologies are unable to (1) identify the pre-defined entity instances within the text and map these identified instances into data records; or (2) verify the extracted entity records based on validation methods and matching rules.

In an attempt to address these shortcomings, conventional named entity recognition engines have been developed to apply linguistic grammar-based techniques as well as statistical models to achieve tasks. However, the direct application of existing named entity recognition technologies to the query problem described above result in several disadvantages. For example, such technologies have poor accuracy. Specifically, the false positive rate is more than 15% for the best named entity recognition engine. Moreover, the false negative rate is even worse. Another problem is slow processing speed due to the nature of natural language text processing. Yet another problem is that conventional named entity recognition technologies are language dependent. This limits flexibility and portability of such technologies because they are designed based on specific individual writing languages.

Hence, the present art lacks a system and a method for extracting entity values from texts. Moreover, the present art lacks a system and method for extracting entity values from text in an information leakage prevention and detection system.

SUMMARY

A system (and a process) as described includes a two-tier architecture for named entity recognition engine. A first tier entity recognition engine is constructed from an advanced regular expression techniques. A second tier entity recognition engine is constructed using a technology referenced as entity fingerprinting.

One embodiment of a system extracts entity values from texts. The system is configured to receive at a first tier entity recognition engine, an input data string having one or more of entities. The system marks entities of the one or more of entities that are extracted by regular expression and transmits the input data stream with the marked entities to a second tier entity recognition engine. The second tier entity recognition engine receives the stream with marked entities and identifies unmarked entities in the input data stream. The second tier entity recognition engine determines whether the input data stream contains any unmarked entities as pre-defined data. Those unmarked entities that comprise the pre-defined data are provided for output.

By way of example, it is noted that one embodiment of an application of the disclosed system (and method) includes building information leakage detection and prevention security systems to protect sensitive information such as personal information, customer information, etc. within an organization's computer networks. This information falls into the category of structured data in the field of data security. In such an example application, the first tier entity recognition engine can be configured to identify entities in a received input data stream using pre-defined regular expressions such as addresses or social security numbers and the second tier entity recognition engine can further process the input data stream to output whether the original data stream contains sensitive data because it matches a pre-defined data for what comprises sensitive data in the particular context of the application within which the system is structured.

In addition, in one embodiment, the system is configured to index data for storage. For example, the system receives at least one entity record and a value for a maximum memory usage. The system divides each entity value into a predetermined number of parts greater than two and calculates a hash value for at least two parts of the divided parts. The system inserts the calculated hash values into an index record and can store the index record.

Indexed records may allow for quick access to entity extraction. For example, in one embodiment, a system can be configured for fingerprinting based entity extraction. The system receives an input stream of a predetermined length comprising characters and it receives a hash table having plurality of indexed entries. The system defines a fixed window length and using the fixed window length isolates a set of a plurality of characters of the input stream. The system generates a hash key, the hash key to index into the hash table and compares the isolated set of plurality of characters of the input stream with the entry corresponding to the index into the hash table to determine whether there is an exact match with the entry. If there is no exact match from the comparison, the system slides the fixed window length one character to isolate another set of a plurality of characters of the input stream in response to. If there is an exact match, the system stores the input stream in response to an exact match from the comparison.

The disclosed system beneficially increases processing efficiency and accuracy for data processing, for example, in document management systems in which sensitive data must be identified for leakage prevention and other security measures. A two-tier architecture further provides efficiencies and increases reliability. For example, a first tier processes data stream using regular expressions to quickly analyze data in a configuration that reduces processing cycles and increases speed. A second tier is configured to identify data using exact data match technique, for example, which may correspond to sensitive data based on matching predefined data. Hence, there is an additional level of security that increases reliability of the system. In sum, the first tier extracts entities using regular expression and the second tier extracts entities using exact match. The data extracted at the second tier, however, need not be in any particular format.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

Figure 1:
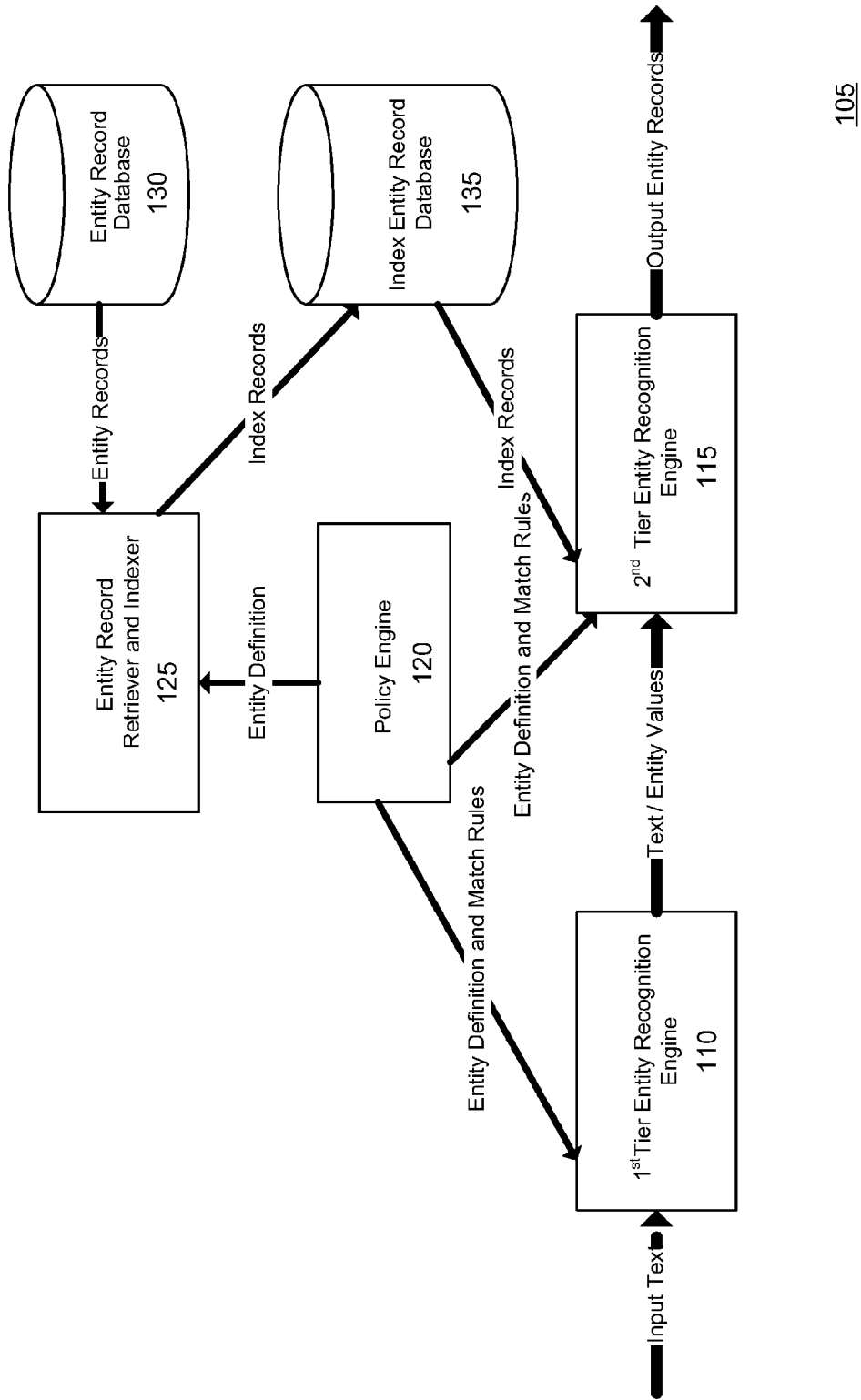
FIG. 1 illustrates one embodiment of a two-tier architecture of an entity recognition engine.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Architectural Overview

In one embodiment, it may be assumed that all entity instances can be presented in a tabular format. For example, one table may include an entity definition and another table may include entity records. For example, the tabular format can be illustrated using the by the following two tables:

Entity Definition

| Entity ID | Entity Name |
|---|---|
| 1 | SSN |
| 2 | Phone Number |
| 3 | Email Address |
| 4 | Account Number |
| 5 | $2^{nd}$ ID |
| 6 | Home address |
| 7 | Credit card number |
| 8 | Birth Date |
| 9 | Birth City |
| 10 | Names |

Entity Records

| Entity ID | Entity Name | Row Index | Entity Value |
|---|---|---|---|
| 1 | SSN | 1 | 139-17-7865 |
| 2 | Phone Number | 1 | 408-567-0987 |
| 3 | Email Address | 1 | Lit3@yes.org |
| 4 | Account Number | 1 | 09876-256782 |
| 5 | $2^{nd}$ ID | 1 | D76549987 |
| 6 | Home Address | 1 | 24 Tech Dr, Sunnyvale, CA 94086 |
| 7 | Credit card number | 1 | 4567-9876-0987-2345 |
| 8 | Birth Date | 1 | Dec. 23, 1982 |
| 9 | Birth City | 1 | Sunnyvale |
| 10 | Names | 1 | John Smith |
| ... | ... | ... | ... |
| 1 | SSN | 10007 | 123-45-6789 |
| 2 | Phone Number | 10007 | 408-555-9876 |
| 3 | Email Address | 10007 | Test_765@yahoo.com |
| 4 | Account Number | 10007 | 12345-09869 |
| 5 | $2^{nd}$ ID | 10007 | D67886123 |
| 6 | Home Address | 10007 | 87 Alpha Street, Milpitas, CA 95035 |
| 7 | Credit card number | 10007 | 3567-98676 |
| 8 | Birth Date | 10007 | Feb. 15, 1956 |
| 9 | Birth City | 10007 | Beijing |
| 10 | Names | 10007 | Gangzhou Zhang |

The disclosure also introduces a concept called template. Each template includes one or more entities in its definition. Users can edit matching policies associated with each template to filter out the entity instances that are not necessarily interesting. Thus, a policy engine also is a included in the architecture of named entity recognition engine. The concept of template and entity combined can be described by the following schemes:

```
Template Name {                Template ID; # An unique integer
to identify this template
                               Template Name; # The name of
the defined template
                               Entity ID 1;
                               Entity ID 2;
                               ...
                               Entity ID n;
}
```

```
Entity Name {
            Entity ID; #
An unique integer to identify this entity
            Entity Name; # The name of the
            defined entity Pattern; #
pattern presented in regular expression
            Entity-internal validation: # a flag to
indicate whether the entity value can be
            # validated by entity-internal.
}
```

Note that the entity definition includes a pattern presented by regular expression. This is because a first tier entity match is solely built based on regular expression data extraction techniques. For those entities that can not be presented by regular expression, the pattern field is null.

Entity-Internal Validation

Some entities have internal mechanisms for its values. For instance, credit card numbers must start with certain digits and all digits together must confine to Luhn checksum. Another example is SSN that comes with areacode-group-number-serialnumber format, where not necessarily every 3 digit number is a valid areacode (area code) and not every 2 digit number is a valid group number for a valid areacode. Phone number and Date also follow certain internal rules. We can validate the entity values based on the internal rules. We refer to this technique as entity-internal validation which is used in the $1^{st}$ tier entity recognition engine to reduce false positives.

Two-Tier Entity Recognition

Each tier of this architecture includes an entity recognition engine and sets of matching rules. The first tier entity recognition engine is built on advanced regular expression techniques. In one embodiment, this tier is configured to handle the entities that can be presented by a regular expression. Examples of such entities include a social security number (SSN), a phone number, an account number (e.g., a bank, mortgage or brokerage account number), a home address, a credit card number, a birth date, etc. Each of the entities identified as regular expression in this tier can be categorized into four types which are extracted using different sub-processes. For example, entities received (or input) at this tier can be extracted by one (or more) of four different regular expression sub-processes.

Type 1—The entity alphabet size is small comparing to ASCII alphabet (or UTF-8 alphabet for other languages other than English). Also one needs to know the following quantities:
  Minimum length of the entity.
  Maximum length of the entity.
  Examples: SSN, birth date, phone#, credit card number, account number, etc.

Type 2—The ending part of the entity has small alphabet size. Also three quantities need to be known:
  Minimum length of the entity.
  Maximum length of the entity.
  The exact length of the ending string and it is long enough, e.g., $\geq 4$.
  Examples: a home address in the USA, a state driver's license#, etc.

Type 3—The entity owns one and only one unique character defined in ASCII table (or UTF-8 table). Also three quantities have to be defined
  The maximum left radius of the special character to the entity
  The minimum left radius of the special character to the entity
  The maximum right radius of the special character to the entity
  Examples: Email address (where the @ character is used)

Type 0 (Generic Type)—All entities that do not belong to any of type 1, 2 and 3.

Matching rules will be defined for the first ($1^{st}$) tier. For example, a template may be defined as:
  Template SSN Birthdate PhoneNumber Name {
  Template ID=1;
  Template Name=Customer Information;
  Entity ID={1,8,2,10};
  }
  Entity SSN {
  Entity ID=1;
  Entity Name=SSN;
  Pattern=[^\d-](\d{9}|\d{3}-\d{2}-\d{4})[^\d-];
  Entity-internal validation=YES;
  }
  Entity Birthdate {
  Entity ID=8;
  Entity Name=Birth Date;
  Pattern=[^\dV]([0-1]?\d[-V][0-3]?\d[-V][1-2]\d{3}|[0-1]?\d[-V][0-3]?\d[-V]\d{2})[^\dV];
  Entity-internal validation=YES;
  }
  Entity PhoneNumber {
  Entity ID=2;
  Entity Name=Phone Number;
  Pattern=[^\d\.-](\d{10}|\(\d{3}\)\s?\d{3}[\.-]?\d{4}|\d{3}-\d{3}-\d{4}|\d{3}\.\d{3}\.\d{4})[^\d\.-];
  Entity-internal validation=YES;
  }
  Entity Name {
  Entity ID=10;
  Entity Name=Names;
  Pattern=N/A
  Entity-internal validation=NO;
  }

Examples of first tier matching rules could be as follows:
  If we catch at least 2 SSNs and 2 Birth dates, forward the text to second ($2^{nd}$) tier
  If we catch at least 2 SSNs and 2 Birth dates, forward the entity values to $2^{nd}$ tier for validation only.
  If we catch at least 1 SSN, 1 Birth date and 1 phone number, forward the text to $2^{nd}$ tier.
  If we catch at least 1 SSN, 1 Birth date and 1 phone number, forward the entity values to $2^{nd}$ tier for validation only.

It is noted that in one embodiment the first tier may be configured to operate on an endpoint in a network, for example, a client computer in a client-server configuration. The endpoint in such a configuration could provide, for example, a preliminary check for specific type of data that should be further reviewed as being sensitive in nature. In alternate embodiments, the first tier may be configured and functional within a server environment, e.g., at a web site receiving data from an endpoint.

The second tier ($2^{nd}$) is configured at a server end and processes a received file from the first tier to identify those entities in the file that are not marked by regular expression and correspond to sensitive data. The second tier entity recognition engine is built on entity fingerprinting processes based on an efficient hash generation/search mechanism. In one embodiment, entity records are pre-indexed prior to this engine taking effect. The second tier engine can have both extraction and validation-only functions:

For any text forwarded from $1^{st}$ tier, entity fingerprinting based extraction algorithm scans the text to extract entity values by checking the pre-indexed entity records. Each extracted entity value is returned along with its Entity ID and Row Index so that entity recognition engine is able to map the entity values into entity records row by row.

For entity values forwarded from $1^{st}$ tier, entity fingerprinting based validation algorithm can retrieve Entity ID and row index for the entity values so that entity values can be mapped into entity records row by row.

Matching rules also can be defined based on entity records or entity sub-records. The examples of matching rules are defined as follows:

If we catch at least 2 sub-records <SSN, Names>, save and present the records.

If we catch at least 1 sub-records <SSN, Birth Date, Names>, save and present the records.

If we catch at least 5 sub-records <SSN, Phone Number>, save and present the records.

Hash Function and Data Structure for Entity Fingerprinting Processes

In one embodiment, a system configured as disclosed herein uses a Karp-Rabin hashing function, which is a polynomial defined as follows:

$$H(S)=x_1 b^{m-1}+x_2 b^{m-2}+\ldots+x_{m-1} b+x_m (\text{mod } q)$$

where $S=x_1 x_2 \ldots x_m$ is a string with length m, b is a base number (usually we take b=256 to extend beyond ASCII table), and q is a big prime number. In our case, q will be defined according to the volume of indexed entity records.

Let $T=t_1 t_2 \ldots t_n$. If we denote $T_k$ as the m-length sub-string of T starting at k-th position, we can derive $H(T_{k+1})$ from $H(T_k)$ with relatively small cost. The iterative formula, which is usually referred as rolling hash, is presented by follows:

$$H(T_{k+1})=[H(T_k)-t_k b^{m-1}]b+t_{k+m} (\text{mod } q)$$

If we treat $H(T_k)$, $t_k$ and $t_{k+m}$ as variables, b and q as constants, the right side of this formula can be denoted as KR-Rolling-Hash(v,$C_1$,$C_2$) where v is the current hash value, $C_1$ is the character at the current position and $C_2$ is the character with m distance from the current position. We use the following data structures for entity record index/extraction/validation:

typedef struct _EntityIndexRecord {
  unsigned int prefixHash;
  unsigned suffixHash;
  unsigned char checkByte;
  unsigned int suffixLen;
  unsigned int entityID;
  unsigned int entityRow;
} EntityIndexRecord;
typedef struct _DGateEntityHash {
  unsigned int recordIdx;
  unsigned char checkByte;
  struct _DGateEntityHash *next;
} DGateEntityHash;
typedef struct _EntityValidationRecord {
  unsigned int suffixHash;
  unsigned int suffixLen;
  unsigned int entityID;
  unsigned int entityRow;
} EntityValidationRecord;

For each entity value v, we divide it into three parts:

Hashing Section: The prefix sub-string with length H that should be configurable for the entire system. This part will be used to generate hash value as index for this record. This is the field of prefixHash of EntityIndexRecord;

Quick Check Byte: The first byte following the hashing part. It will be stored in hash table to speed up entity value validation.

Validation Section: the suffix sub-string following the Quick Check Byte. This part will be used to generate hash value stored in EntityIndexRecord and loaded into EntityValidationRecord for validation purpose.

There will be four processes related to this entity fingerprinting technologies. Each one of the processes may be structured as instructions executable by a processor:

Index Construction Process—translates entity records into index records and save the index records into index files.

Index Loading Process—loads index records from index files into hash tables and validation records Entity Extraction Process—scans a text to extract entity instances. It returns entity records in triplet format as <value, Entity ID, row index>.

Entity Validation Process—validate a given entity instance and return entity records in triplet format as <value, Entity ID, row index>.

Two Tier Architecture for Entity Recognition Engine

Referring now to Figure (FIG. 1, it illustrates one embodiment of a two-tier architecture of an entity recognition engine. The two-tier architecture of entity recognition engine shown in FIG. 1 includes six components. The six components include a first ($1^{st}$) tier entity recognition engine 110, a second tier entity recognition engine 115, a policy engine 120, an entity record retriever and indexer 125, an entity record database 130, and an index entity record database 135.

The first tier entity recognition engine 110 extracts entity records from texts based on advanced regular expression processes according to four entity types and applies first tier matching rules. Examples of the four entity types and matching rules were further described above. The second tier entity recognition engine 115 extracts entity records from texts based on entity fingerprinting technologies and applies second tier matching rules, also as were described above.

The policy engine 120 defines each entity that requires extraction/validation. It also defines the match rules for both tiers. In one embodiment, the policy engine 120 provides the rules as to what is sensitive information and what is not, as well as what constitutes an exact match between the entity input and entities that should be sent from the first tier 110 to the second tier 115. The entity record retriever and indexer 125 queries entity records from the entity record database 130 according to the entity definition and saves into file systems (or pass to the indexer 125). The indexer 125 indexes the entity records into index records and stores into an index database. The entity record database 130 stores original entity data that the system extracts from texts and the index entity record database 135 stores the index records.

Figure 2:
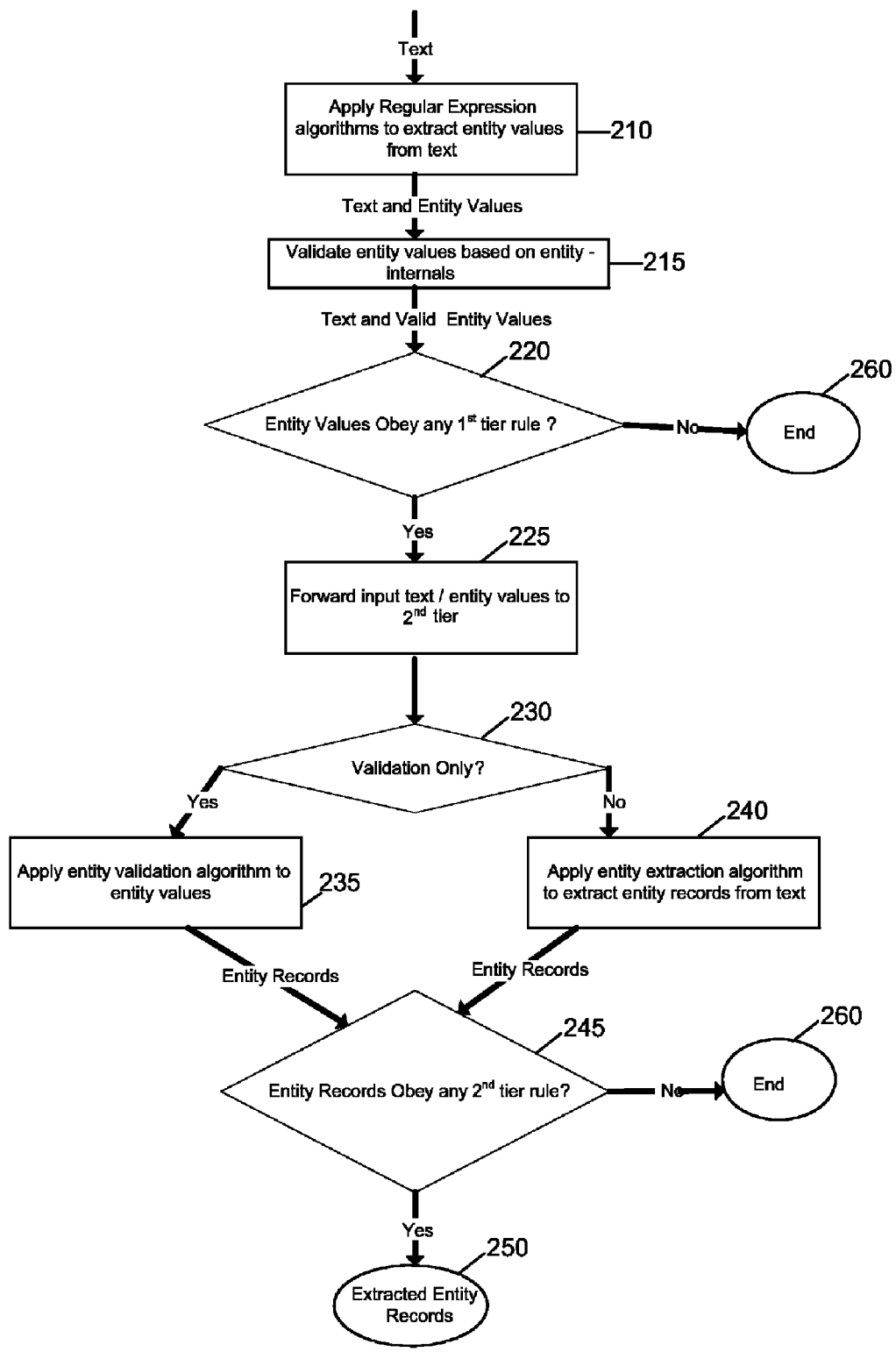
FIG. 2 illustrates one embodiment of a two-stage procedure of entity recognition based on the two-tier architecture.

Turning to FIG. 2, it illustrates one embodiment of a two-stage procedure of entity recognition based on the two-tier architecture, for example, as illustrated in FIG. 1. The process includes a two-stage procedure to extract entity records from an input text. In particular, the process starts with, for example, a text input at the first tier 110. The process then applies 210 one or more of the four regular expression processes described previously to the input text to extract entity values according to entity types. The process also applies first tier match rules to the extracted entity values.

Next, the process validates 215 the extracted entity values and keeps only the valid entity values. Valid entity values are values that obey the internal rules of a specific entity. For example, a valid credit card number must start with some prefix digits (e.g., a first 2 digits must be 51-55 for a MasterCard® number or a first digit must be 4 for VISA® number) and the digits must follow Luhn checksum. In this example, application of the rules as disclosed herein allows for credit card number validation. The process continues with determining 220 if the first tier match rules are satisfied. If the first tier match rules are not satisfied the process stops 260 as no regular expression has been identified. If the first tier match rules are satisfied, the process forwards 225 the input text/entity values to a second tier 115.

At the second tier 115, the process determines 230 if there is entity value validation only. If so, the process applies 235 an entity validation algorithm to the entity values. If not, the process applies 240 an entity extraction algorithm based on entity fingerprinting to the input text to extract entity records. The process then determines 245 whether the entity records obey (or satisfy) second tier match rules for the extracted entity records. If not, the process stops 260, e.g., no sensitive data has been identified based on the applied rules. However, if the entity records do satisfy the second tier match rules, the process outputs 250 final extracted entity records, e.g., identifying the sensitive data from the original input string at the first tier 110.

Figure 7:
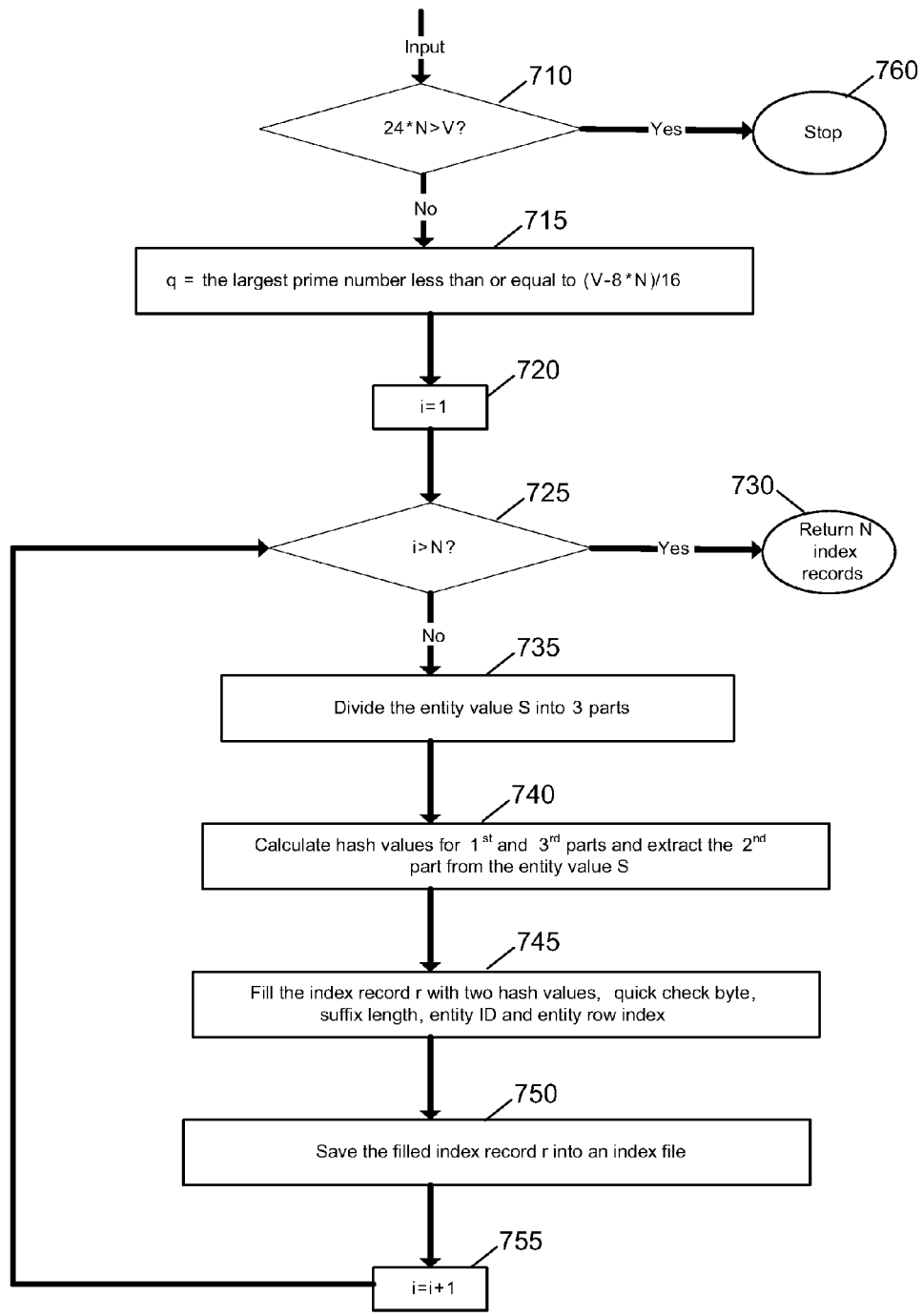
FIG. 7 illustrates a flowchart for one embodiment of an entity fingerprinting index construction process.
Figure 8:
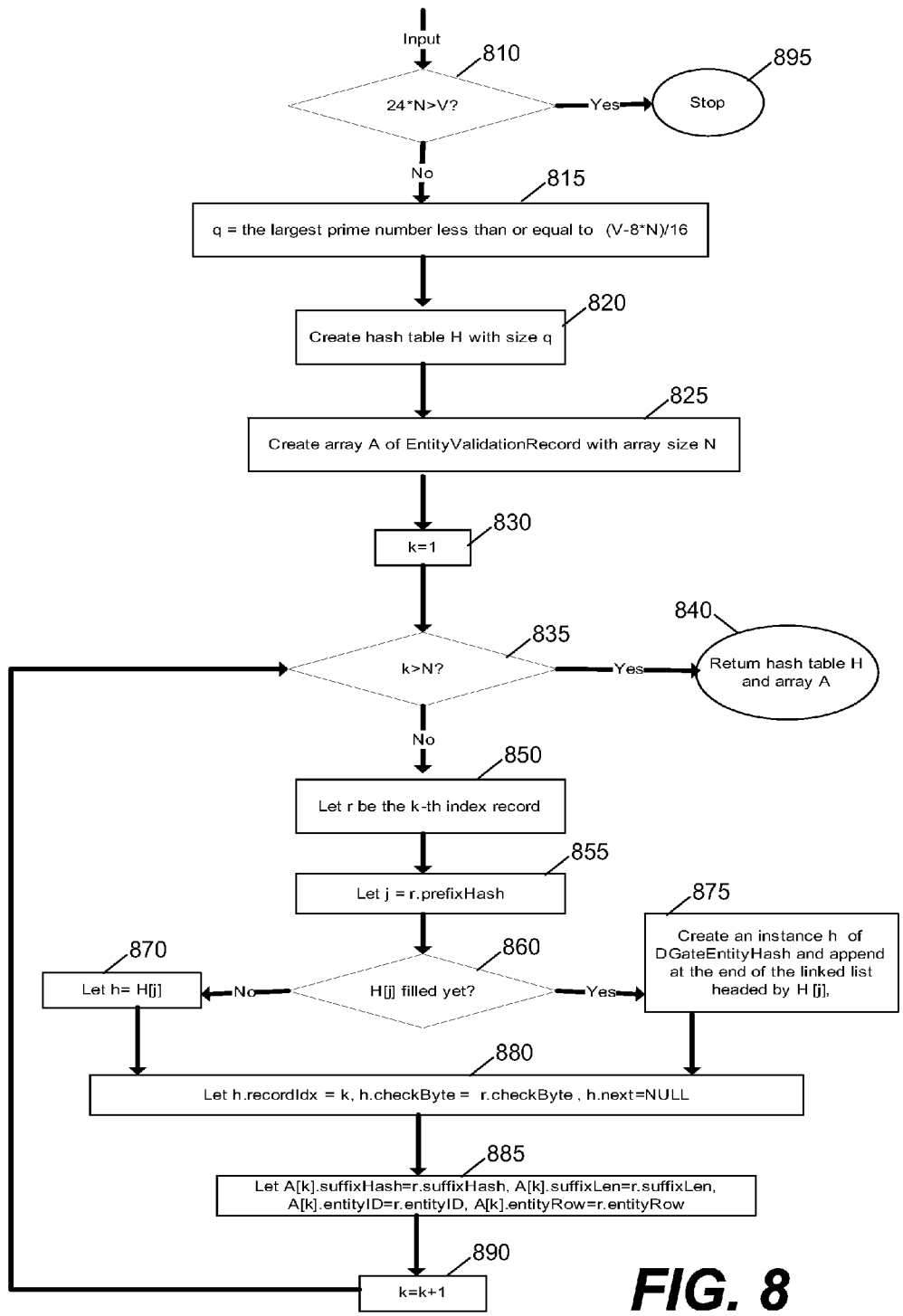
FIG. 8 illustrates a flowchart for one embodiment of an entity fingerprinting index loading process.

The system and process illustrated through FIGS. 1 and 2 can be quite resource intensive, particularly to identify entities based on regular expressions within texts. To help improve processing efficiency, in one embodiment, the first tier 110 can be further structured to include additional processes (or sub-processes) that reduce processing time, thereby saving processing resources and reducing overall processing costs. In particular, FIGS. 3 through 6 illustrate processes for increasing regular expression processing. In addition, additional cost reduction for system resources are available through efficient storage of data for use in matching at the second tier 115. In particular, FIGS. 7 and 8 illustrate pre-processing techniques that correspond to storing data in the index entity record database 135, for example, to rapidly analyze exact matching in the second tier 115. Further FIG. 9 describes a process for entity extraction from a rolling hash concept with system efficiencies and FIG. 10 illustrates an embodiment for entity validation based on fingerprinting.

As for FIGS. 3 through 10, each is further described herein using notations as follows: T[s] refers to the character at position s for string S; T[s,t] refers to the sub-string starting at s and ending at t for string S; and KRH-Hash(S) refers to the Karp-Rabin hash function. Note that if S=NULL, KRH-Hash(S)=−1. In addition, KR-Rolling-Hash(k,$C_1$,$C_2$) refers to the Karp-Rabin hash function based on rolling hash. Further, reference to an entity value is as an individual instance of an entity and reference to an entity record is the triplet <entity value, row index, entity ID>.

It is noted that the processes in FIGS. 3 through 10 (as well as FIGS. 1 and 2) may be embodied as instructions that are stored in a computer readable storage medium (e.g., a memory or a disk) and are executable by a processor. Examples of such configurations will be further described later in the disclosure.

Regular Expression Processing

Figure 3:
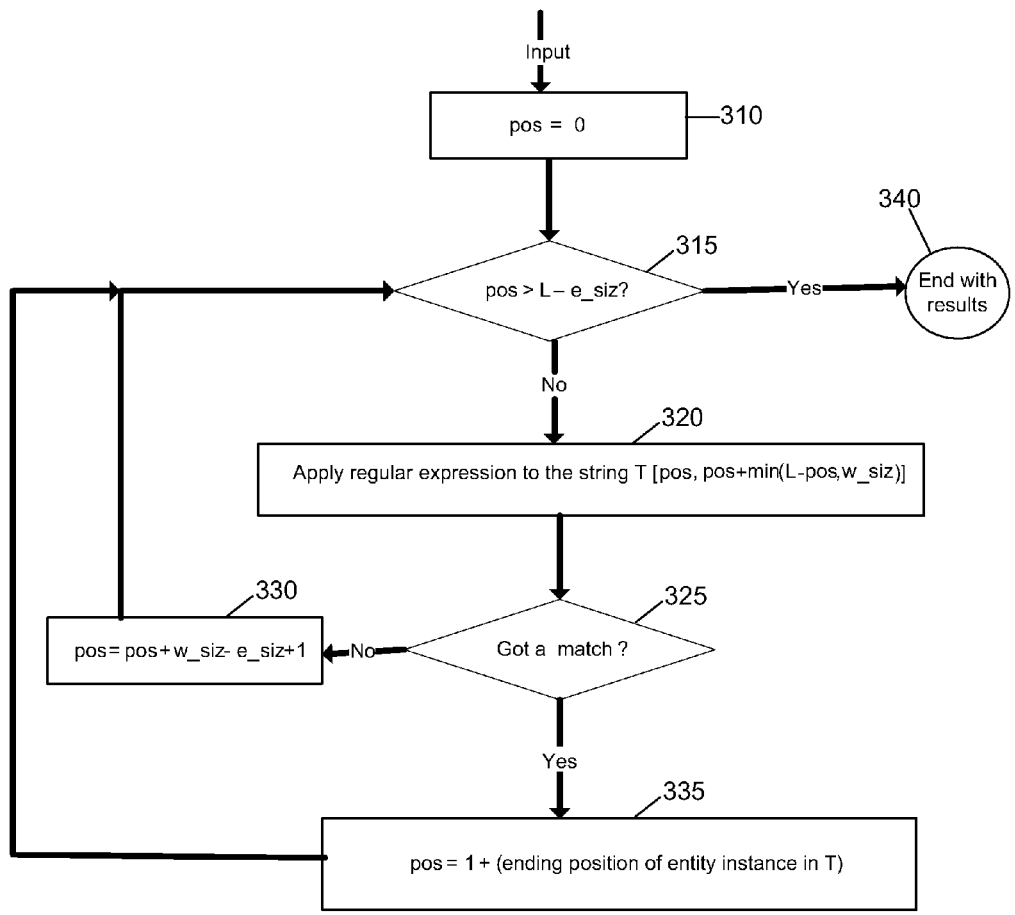
FIG. 3 is illustrates a flowchart for one embodiment of a naïve entity extraction process based on regular expression and an entity extraction type 0.

Referring first to FIG. 3, it illustrates a flowchart for one embodiment of a naïve entity extraction process based on regular expression for the entity type 0. In one embodiment, the process is configured to determine how to find all the instances for a type 0 (described previously) named entity. It is noted that in one embodiment the process described through FIG. 3 may be applied to and optimized for files that include small digit value, for example, credit card numbers or social security numbers.

The entity definition provides the regular expression for the data pattern. This allows for recognition of the entity instances across texts. Usually, regular expression only looks for a first instance in a string. Therefore, it is beneficial to divide the whole text into pieces with the intention that each piece only contains one entity instance.

Each piece may be considered a match window, is then slid across a data patterns that has been divide or cut into several pieces of predetermined size, for example, 128 byte windows. The process then continues in a slide-window configuration. Specifically, in this configuration, the window size is fixed as w_siz and an assumption is made that all entity size can not exceed e_siz. Thereafter, the process sets w_siz>e_siz. The matching process starts right in the beginning of the text with the match window size as w_siz. It applies the regular expression to this text window, trying to catch any entity instance. If caught, the instance is saved and the window is slid to the position right after the caught instance; otherwise the window is slid to the right with w_siz−e_siz+1 positions. This iteration is repeated until reaching the end of the text.

In one embodiment, the naïve extraction process inputs text T, text length L, window size w_siz and entity maximum size e_siz. The process sets (or lets) 310 pos=0 and determines 315 if pos>L−e_siz. If it is, the process outputs 340 a result. If not, the process applies 320 regular expression to the window T[pos,pos+min(L−pos,w_siz)]. The process then determines 325 if there is a match. If there is a match, the process catches an entity instance, saves the instance and sets (lets) 335 pos=1+(the ending position of the instance). The process then returns to determining 315 if pos>L−e_siz as described above. If there is no match, the process sets (or lets) 330 pos=pos+w_siz−e_siz+1, returning to the step of determining 315 if pos>L−e_siz as described above. Once pos>L−e_siz, the process outputs 340 all caught instances of identified regular expressions (e.g., sensitive data such as social security number or credit card number) and can stop.

Figure 4:
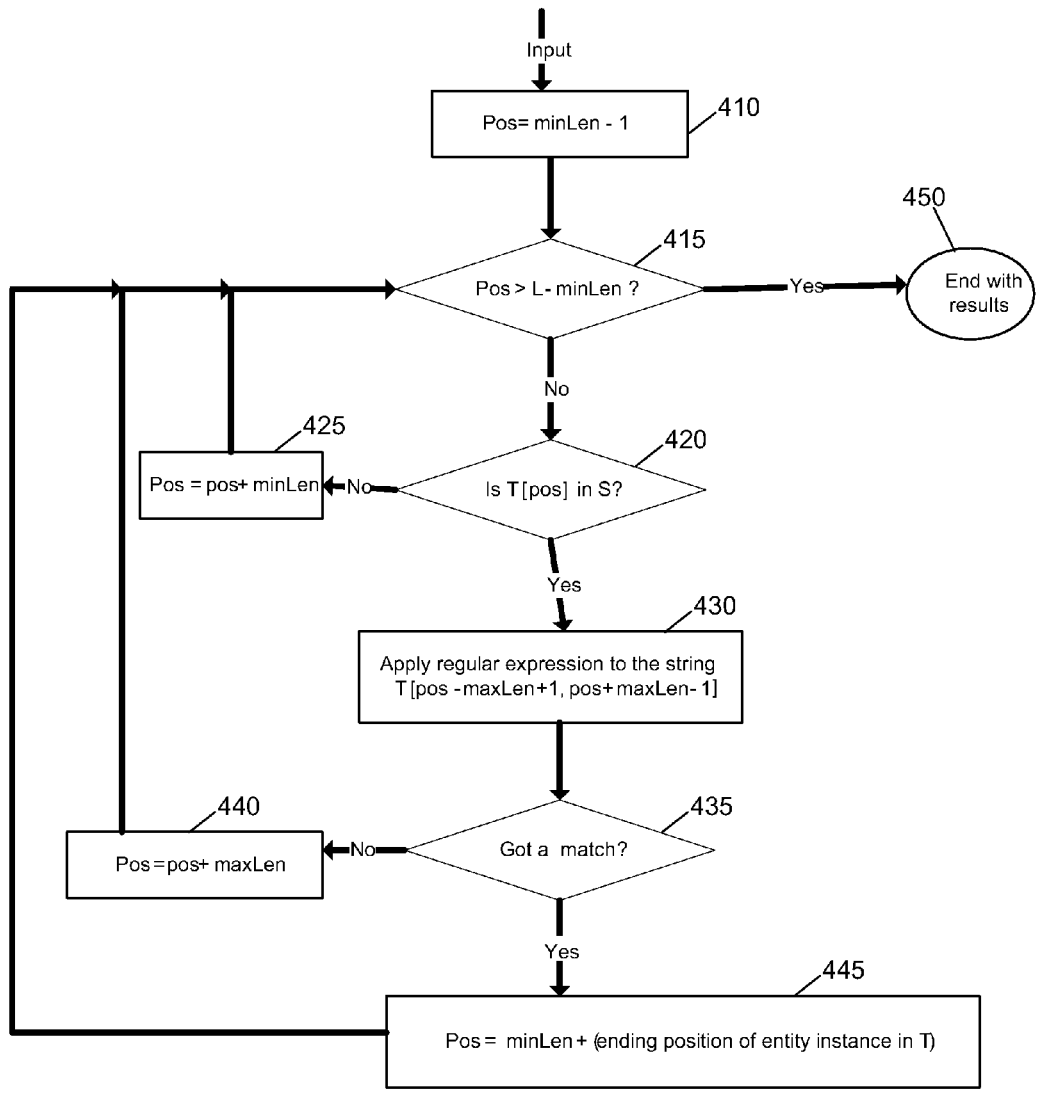
FIG. 4 illustrates a flowchart of one embodiment for a type 1 entity extraction process based on regular expression.

Turning to FIG. 4, it illustrates a flowchart of one embodiment for a type 1 (described previously) entity extraction process based on regular expression. Although the naïve extraction process described with FIG. 3 can be applied to any entity presented in regular expression, in some instances it may be desirable to execute fewer regular expression matches. This is because each regular expression match can be expensive due to inclusion of a FSM (Finite State Machine) mechanism.

In one embodiment, the process in FIG. 4 may determine that most of the windows initially described with FIG. 3 may not be necessary. Thus, to improve the performance in one embodiment the process may reduce the number of matching windows, which may be defined by type 1 entities. For example, start with a social security number (SSN) entity with the normal format ddd-dd-dddd. It is an entity that consists of only 10 digits and the character in ASCII alphabet (with total 128 characters). Eleven out of 128 characters provides less than 8.6% probability. Thus, the process provides an intelligent way to skip all characters which are not digits or character '-'. Further, it only slides a window around digits and the character '-'. This reduces the number of matching windows. The same principles may be applied to other configuration such as credit card numbers, for example, Visa as four sets of four digits and American Express has three sets of numbers that are four digits, six digits, and five digits in length.

Reviewing the process in greater detail, in one embodiment the system receives an input text T, text length L, maxLen and minLen, entity alphabet S. The process sets pos=minLen−1 and determines 415 if pos>L−minLen. If so, the process output 450 the result. If not, the process then determines 420 if T[pos] is in S. If not, the process sets 425 pos=pos+minLen and goes back to determining 415 whether pos>L−minLen. If T[pos] is in S, the process sets a match window to the string T[pos−maxLen+1, pos+maxLen−1] and applies 430 a regular expression. The process then determines 435 if there is a match. If the match is successful, the process saves the entity instance by setting pos=(ending position of entity instance)+minLen. The process then returns to determining 415 if pos>L−minLen. If the match is unsuccessful, the process sets pos=pos+maxLen and returns to determining 415 if pos>L−minLen. Once the process determines pos>L−minLen, it outputs the matched entity instances corresponding to the regular expression (e.g., sensitive data such as social security number or credit card number).

Figure 5:
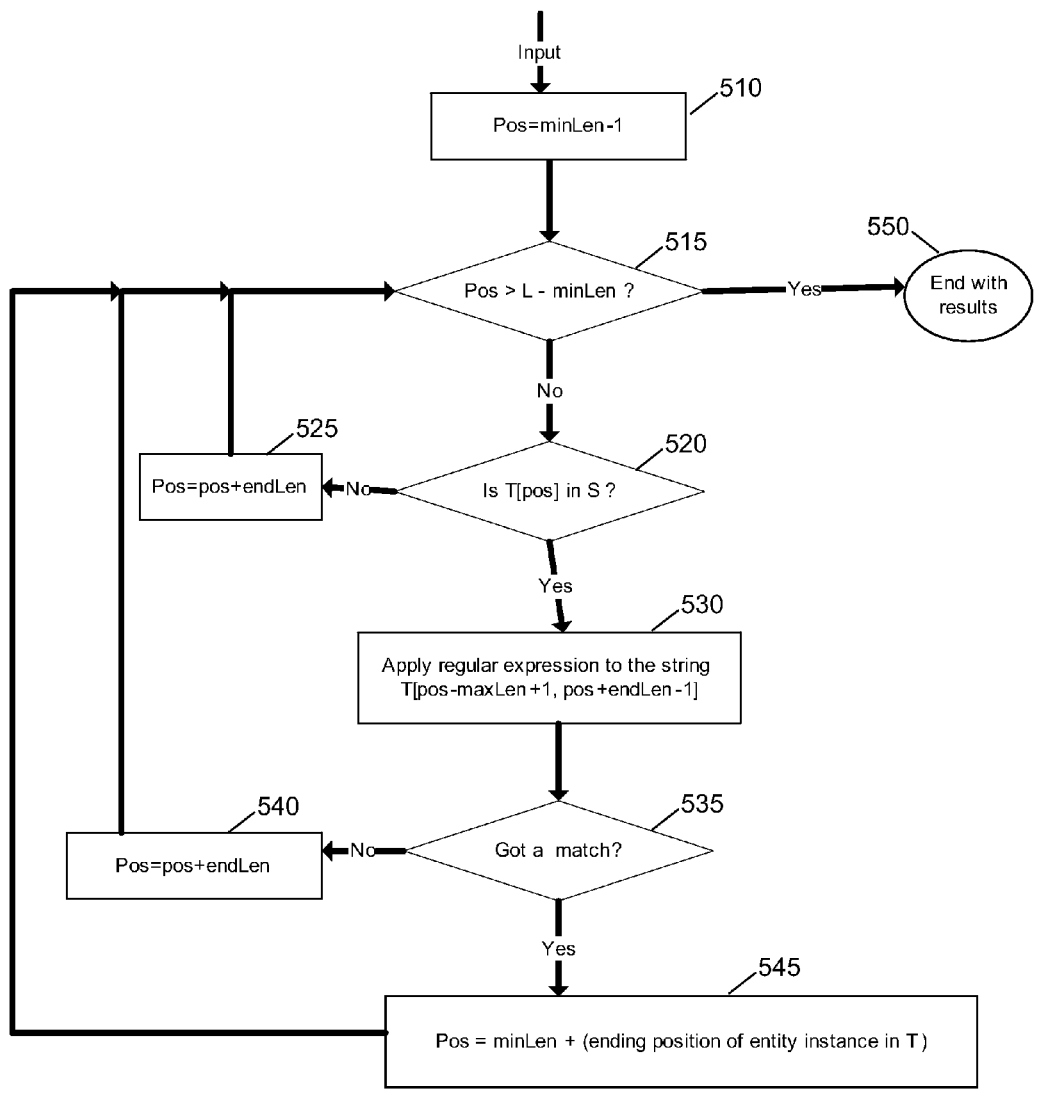
FIG. 5 illustrates a flowchart of one embodiment for a type 2 entity extraction process based on regular expression.

FIG. 5 illustrates a flowchart of one embodiment for a type 2 entity extraction process based on regular expression. This process also may reduce the number of match windows. This process is described by way of example to a home address format for a home address as set forth in the U.S.A. (e.g., identifying a zip +4 zip code in the address) or a state driver license having a predetermined format (e.g., identifying an alphabet letter followed by a seven digit numeric sequence).

The process begins with inputting text T, text length L, maxLen, minLen, endLen, entity ending string alphabet S. The process sets 510 pos=minLen−1. The process determines 515 if pos>L−minLen. If so, the process outputs 550 the results. If not, the process determines whether T[pos] is in S. If it is not, the process sets 525 pos=pos+endLen and goes back to determining 515 if pos>L−minLen. If T[pos] is in S, the process sets the match window to T[pos−maxLen+1, pos+endLen−1] and applies 530 the regular expression.

The process then determines 535. If the match is successful, the process saves the entity instance by setting 545 pos=(ending position of entity instance)+minLen. The process then returns to determine 515 if pos>L−minLen. If the match was unsuccessful, the process sets pos=pos+endLen and returns to determines 515 if pos>L−minLen. Once the process determines that pos>L−minLen, the process outputs the matched entity instances, for example, the regular expression corresponding to the home address or state driver license.

Figure 6:
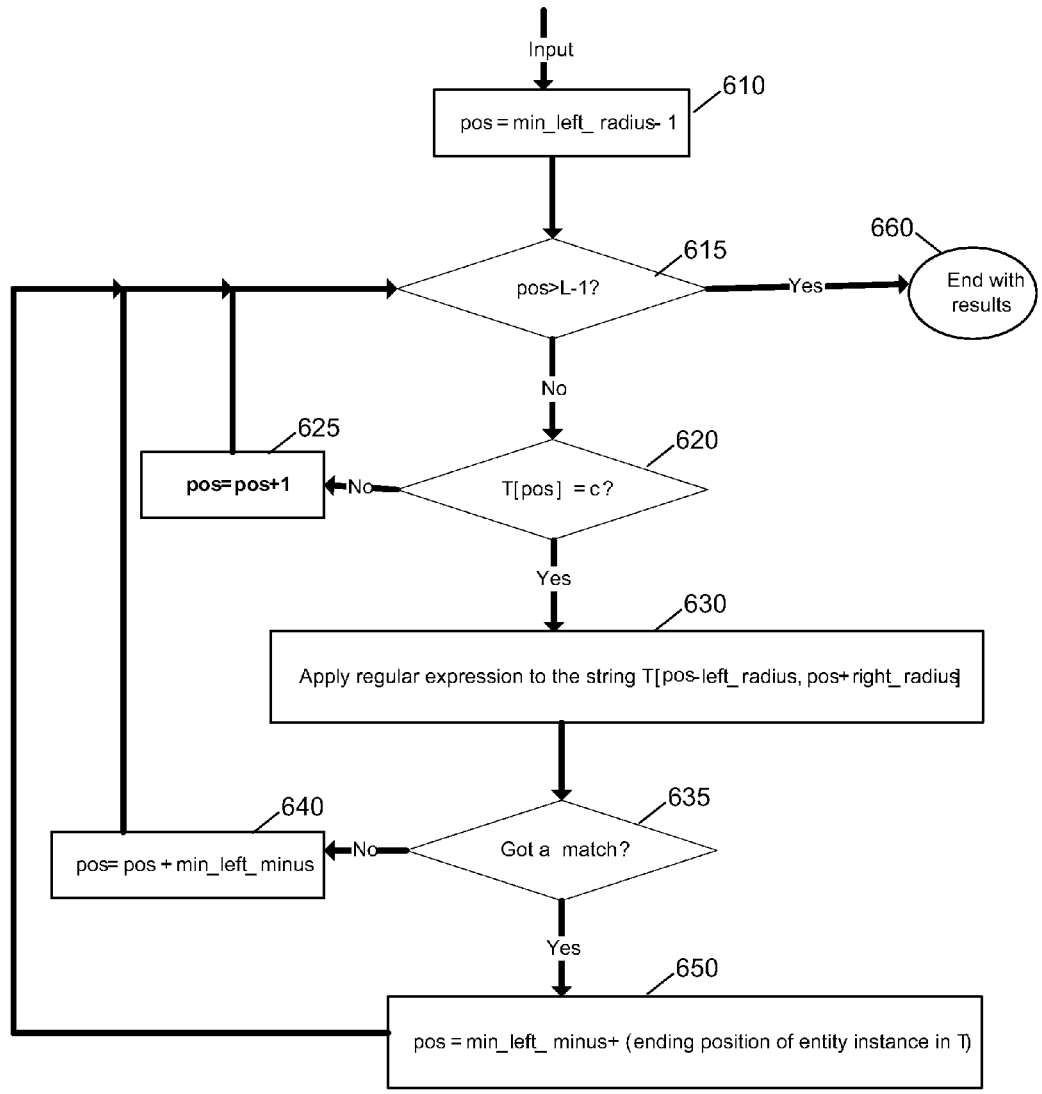
FIG. 6 illustrates a flowchart of one embodiment of a type 3 entity extraction process based on regular expression.

FIG. 6 illustrates a flowchart of one embodiment of a type 3 entity extraction process based on regular expression. This illustrative embodiment is yet another effort to reduce the number of match windows. In this example embodiment, a sample entity is an electronic mail (email) address, which includes the '@' character.

The process begins with inputting text T, text length L, min_left_radius, left_radius, right_radius and special character c. The process then sets 610 pos=min_left_radius−1. The process determines 615 if pos>L−1. If so, the process outputs 660 the result. If not, the process determines 620 if T[pos]=c. If T[pos]≠c, the process sets 625 pos=pos+1 and returns to determine 615 if pos>L−1. If the process determines 620 T[pos]=c, the process sets the match window=T[pos−left_radius, pos+right_radius] and applies 630 the regular expression. The process then determines 635 if there is a match. If the match is successful, the process saves the entity instance and sets 650 pos=(ending position of entity instance)+min_left_radius. The process then returns to determine 615 if pos>L−1. If the match is not successful the process sets 640 pos=pos+min_left_radius. The process then returns to determine 615 if pos>L−1. Once the process determines 615 pos>L−1, the process outputs 660 the matched entity instances, for example the regular express corresponding to the email address.

Pre-Processing for Data Storage

FIGS. 7 through 10 illustrate embodiments for entity fingerprinting technologies that can extract entity records from texts. Entity fingerprinting technologies include, for example, four processes. These processes are index entity records, load entity record indices, extract entity records from texts based on indices, and validate entity values based on indices. Each process is described in greater details in FIGS. 7 through 10.

Referring first to FIGS. 7 and 8, these illustrate embodiments for pre-processing of data storage so that exact matching at the second tier 115 can be quickly accomplished. Specifically, FIG. 7 illustrates a flowchart for one embodiment of an entity fingerprinting index construction process. The process begins with an input that includes an entity prefix size m, a maximum memory usage V, and N entity records. In this instance, V and N are numerical values, for example, integer values.

Each record is in the format of a triplet <entity value (S), row index (r), entity ID (c)>. The process then determines 710 if 24*N>V, which in one embodiment is an estimation of memory usage, V, in order to process N entity values. If so, the process stops 760. If not, the process sets 715 q to be the largest prime number less than or equal to (V−8*N)/16, where q is the size of the hash table and in one embodiment, this number is derived mathematically from the estimation of the best hash table size. This value will be used by Karp-Rabin hashing function. For each entity record in triplet <S, r, c>, the process sets 720 i=1 and determines 725 if i>N. If i>N, the process returns (or outputs) the N index records. If not, the process divides 735 S into three parts. The three parts are hash section with m bytes, a quick byte with 1 byte, and a validation section with (length(S)−m−1) bytes.

Next, the process calculates 740 hash value of a first part and third part using Karp-Rabin hashing function. and extract quick check byte for second part. The process fills (or inserts or populates) 745 the three values and related information into an index record defined by EntityIndexRecord. Specifically, the filled information is the hash value of first part to the field prefixHash, the second part quick byte to the field checkByte, the hash value of the third part to the field suffixHash, the length of third part to the field suffixLen, and the Entity ID and entity row index into the two fields entityID and entityRow. The process saves 750 the index record into an index file defined by EntityIndexRecordDefFile. The process then increments 755 i=i+1 and returns 725 to determine if i>N. Once i>N, the process outputs N index records in multiple index files defined by EntityIndexRecordDefFile or simply stops 730 with the results stored in storage (e.g., memory).

Turning to FIG. 8 illustrates one embodiment a process for entity index loading process. The entity index loading process is used load the index for use by the system. The index can be loaded, for example, once index construction is completed. The process begins with receiving an input in which an entity prefix size m, a maximum memory usage V, and N index records stored in multiple index files defined by, for example, EntityIndexRecordDefFile. The process then determines 810 if 24*N>V, which as noted before in one embodiment is an estimation of memory usage, V, in order to process N entity values. If so, the process stops 895. If not, the process sets 815 q to be the largest prime number less than or equal to (V−8*N)/16, where as noted before q is the size of the hash table and in one embodiment, this number is derived mathematically from the estimation of the best hash table size. The process then creates 820 a hash table H defined by DGateEntityHash with table size q and creates 825 an array of Entity-ValidationRecord with size N. The array is denoted as A.

Beginning with k set 830 to 1 and determines 835 if k>N. If k is not greater than N, the process for each index record r, denoted 850 as k-th index record, sets 855 j=r.prefixHash. The process determines 860 if the fields of H[j] are filled (or inserted or populated). If the fields are filled, the process creates 875 an instance h of DGateEntityHash and appends it at the end of the linked list headed by H[j]. If the fields are not filled, the process sets 870 h=H[j]. Once either of these steps is completed, the process fills 880 the fields of h. Specifically, the process sets h.recordIdx=k; h.checkByte=r.checkByte; and h.next=NULL. The process then fills 885 the fields of A[k]. Specifically, the process sets A[k].suffixHash=r.suffixHash; A[k].suffixLen=r.suffixLen; A[k].entityID=r.entityID; and A[k].entityRow=r.entityRow. The value of k is incremented 890 and the process determines 835 if k>N. If not, the process repeats. Otherwise the process outputs the filled hash table H and the array A of validation records.

Extraction

Figure 9:
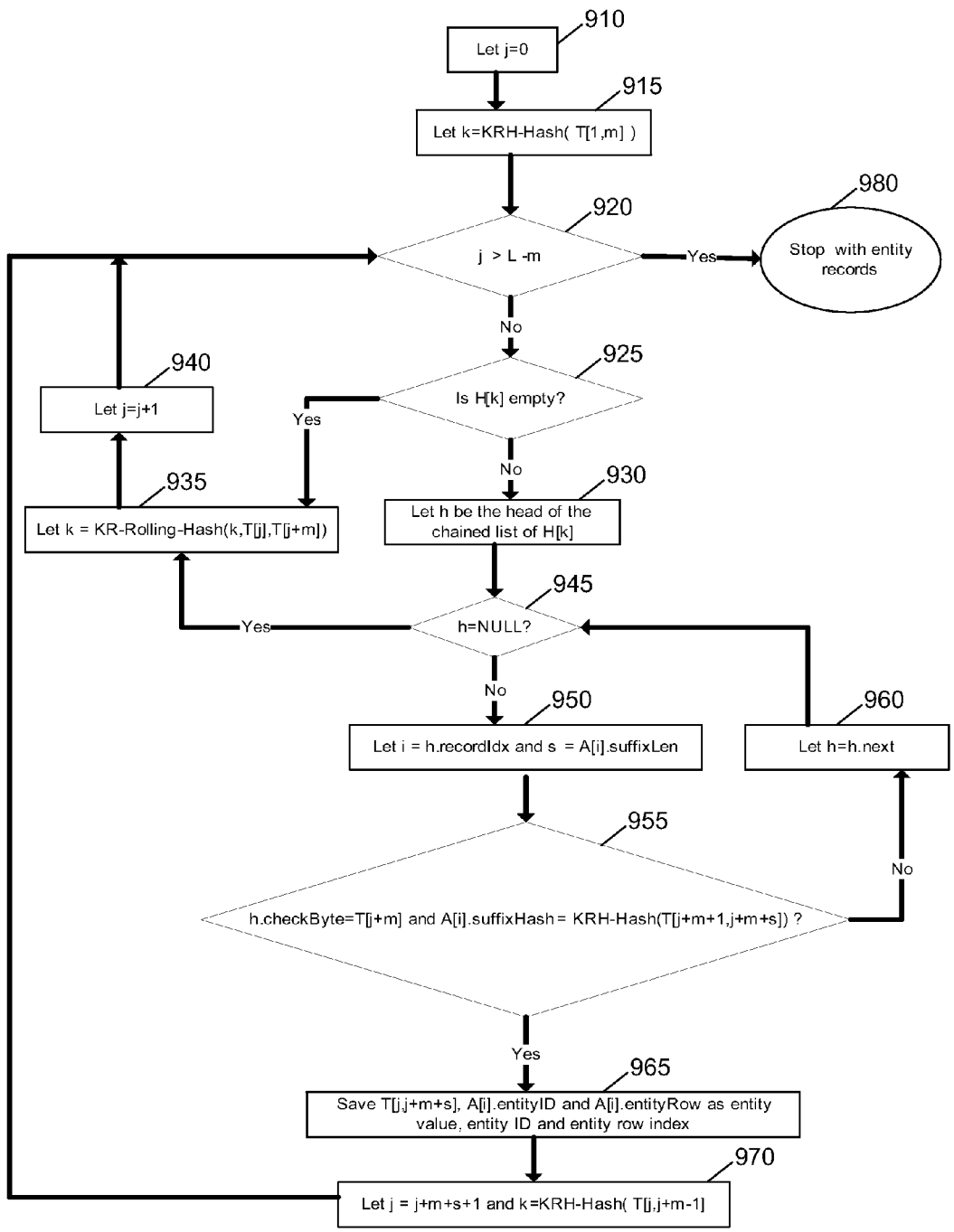
FIG. 9 illustrates a flowchart for one embodiment of a fingerprinting based entity extraction process.
Figure 10:
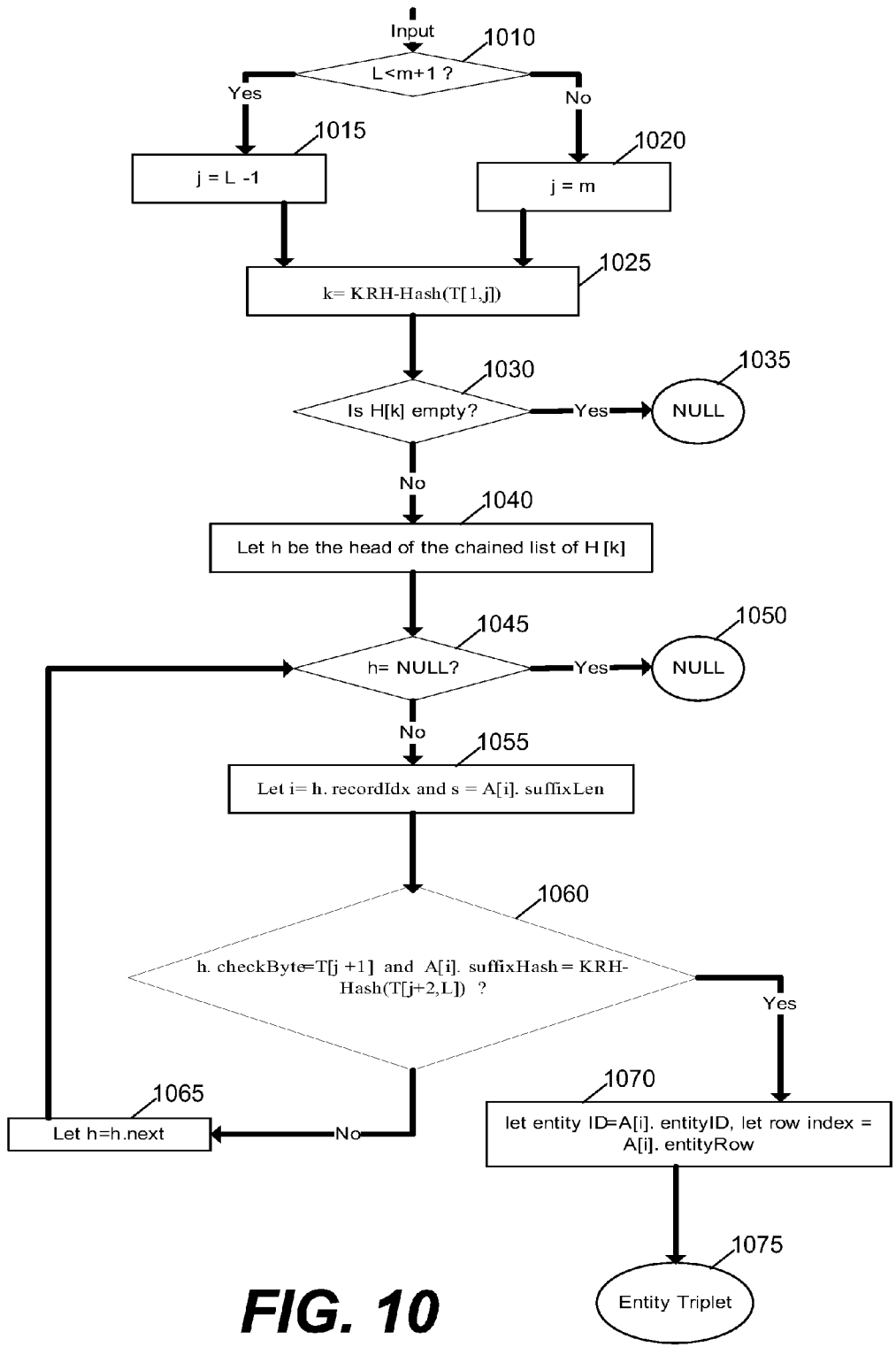
FIG. 10 illustrates a flowchart for one embodiment of a fingerprinting based entity validation process.

Next, FIG. 9 illustrates one embodiment of a process for fingerprinting based entity extraction. Generally, having a given input stream and a fixed length hash window, the process allows to move the window one-character forward to see if there is matching to extract entities. Further, with an initial hash value, the process leverages a fingerprinting technique that calculates subsequent hash values efficiently based on previous hash values using a predetermined formula when determining matches and extraction This results in processing efficiency and reduction of processing resources.

This process is used to determine an entity match by predefining window size and sliding that window to evaluate whether an exact match occurs between what the window isolates and what it is compared against. The process starts by inputting text T with length L, a hash table H and an array A of validation records, a hash table size q (the prime number created in the process described in FIG. 8), and an entity prefix size m. The input text is the given input stream and the hash key is generated (but not necessarily increased). This allows for a window size that is fixed (in length) or predefined (in length). The window is then a sliding window that is moved in predefined lengths (or portion) to determine if there is a match against the entity records to be compared. Specifically, the process sets 910 j=0 and sets 915 k=KRH-Hash(T[1,m]). The process determines 920 if j>L-m. If that is the case, the process stops and returns 980 with entity records. If that is not the case, the process determines 925 if H[k] is empty. If H[k] is empty, the process sets 935 k=KR-Rolling-Hash(k,T[j],T[j+m]) and increments 940 j=j+1 before once more determining 920 if j>L-m. If j>L-m, the process slides the window to the next window to determine whether an entity match exists. Hence, in one embodiment, the system beneficially leverages a rolling hash technique as a part of the process.

If H[k] is not empty, the process sets 930 h to be the head of the chained list of H[k] and determines 945 if h=NULL. If h=NULL, the process sets 935 k=KR-Rolling-Hash(k,T[j],T[j+m]) and increments 940 j=j+1 before once more determining 920 if j>L-m. When h=NULL, it means there is no match and the process incrementally moves to the next window. If h is not NULL, the process sets 950 i=h. recordIdx and s=A[i]. suffixLen. Specifically, when h is not NULL, there may be a match and the system collects information for further verification, for example, retrieving a validation record index i and suffix length s for the possible entity value. The process then determines 955 if h. checkByte=T[j+m] and A[i].suffixHash=KRH-Hash(T[j+m+1,j+m+s]). This verifies the entity value using validation record (or fingerprinted record).

If the entity value is not verified at this step, the process sets 960 h=h.next and once more determines 945 if h=NULL. That is, if the previous verification fails, the process continues with checking the next item in the chained list. Otherwise, the process saves 965 entity value=T[j, j+m+s], entity ID=A[i]. entityID, row index=A[i]. entityRow, save these three values and sets 970 j=j+m+s+1 and k=KRH-Hash(T[j,j+m-1]). The process then again determines 920 if j>L-m. Once that is the case, the process stops and outputs 980 all entity records in the triplet <entity value, row index, entity ID>. Alternatively, the triplet values can be stored (e.g., in a memory) for later retrieval.

Entity Validation

FIG. 10 illustrates a process for one embodiment of fingerprinting based entity validation. The process begins with an input of an entity value T with length L, an entity ID, a hash table H, an array A of validation records, and an entity prefix size m. The hash table has a size q (the prime number created through the process described with respect to FIG. 8). The process determines 1010 if L<m+1. If so, the process sets 1015 j=L-1 and if not, the process sets 1020 j=m, which sets the window size. The process sets 1025 k=KRH-Hash(T[1, j]), which calculates the hash value for the prefix of this entity value, T. The process determines 1030 if H[k] is empty. It is noted that H[k] is the k-th slot of the hash table and that the hash table in this embodiment is an array of slots with indices defined by hash value.

If yes, the process returns 1035 NULL. If H[k] is not empty, the process sets 1040 h be the head of the chained list of H[k] and determines 1045 if h=NULL. If h=NULL, the process returns 1050 NULL. If h is not NULL, the process sets 1055 i=h.recordIdx and s=A[i].suffixLen. The process then determines 1060 if h.checkByte=T[j+1] and A[i].suffixHash=KRH-Hash(T[j+2,L]). In particular, this verifies if the given string T matches a fingerprinted entity value. If not, the process sets 1065 h=h.next and goes back to determine 1045 h=NULL. If so, the process sets 1070 entity ID=A[i].entityID and sets row index=A[i].entityRow. Specifically, if it is determined 1060 that the given string, T, is verified as matching, the process records the matched entity information which consists of entity ID and row Index. These two items define a cell in a database table. The process then returns (or output) 1075 the triplet <T, entity ID, row index>, which alternatively, can be stored in a storage (e.g., a memory).

Additional Configuration

Some portions of above description describe the embodiments, e.g., in FIGS. 2 through 10, in terms of processes or algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

The disclosed system beneficially increases processing efficiency for data processing, for example, in document management systems in which sensitive data must be identified accurately for leakage prevention and other security measures. A two-tier architecture further provides efficiencies and increases reliability. For example, a first tier processes regular expressions to quickly analyze regular expressions to filter out non-sensitive data in a configuration that reduces processing cycles and increases speed. A second tier is configured to identify entity values not marked as regular expression, but which correspond to sensitive data based on matching predefined data. Hence, there is an additional level of security that increases reliability of the system. Yet another benefit is that entity fingerprinting is an exact data match which provides a mean for precise data identification, which, inter alia, enhances system reliability.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for a two tiered architecture of named entity recognition engine through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for extracting entity values from texts comprising:
   receiving, at a first tier entity recognition engine, an input data string having a plurality of entities;
   determining entities to be marked based on regular expression by sliding a window across the input data string;
   applying the regular expression to text in the window;
   marking the entities of the plurality of entities based on matching rules for the regular expression;
   transmitting the input data string with the marked entities to a second tier entity recognition engine;
   identifying unmarked entities in the input data string received at the second tier entity recognition engine by using a fingerprinting based entity extraction process, wherein the fingerprinting based entity extraction process comprises sliding a window and determining if a hash value computed from a portion of the input data string isolated by the window matches a hash value entry stored in a pre-loaded hash table;
   determining whether the unmarked entities satisfy a plurality of matching rules; and
   outputting the unmarked entities of the plurality of entities that satisfy at least one of the matching rules.

2. The method of claim 1, wherein the fingerprinting based entity extraction comprises scanning the input data string to extract the unmarked entities by checking pre-indexed entity records.

3. The method of claim 1, wherein the pre-loaded hash table is constructed by dividing each entity value into a plurality of parts and calculating a hash value entry for at least two of the plurality of parts.

4. The method of claim 1, wherein the hash value is calculated using a Karp-Rabin hash function.

5. The method of claim 1, wherein said entities comprise sensitive information being protected by an information leakage and detection system.

6. A system for extracting entity values from texts comprising:
   a first computer apparatus having a first tier entity recognition engine configured to receive an input data string having a plurality of entities,
   determine entities to be marked based on regular expression by sliding a window across the input data string;
   apply the regular expression to text in the window;
   mark the entities of the plurality of entities based on matching rules for the regular expression;
   transmit the input data string with the marked entities to a second tier entity recognition engine;
   identify unmarked entities in the received input data string with the marked entities by using a fingerprinting based entity extraction process, wherein the fingerprinting based entity extraction process comprises sliding a window and determining if a hash value computed from a portion of the input data string isolated by the window matches a hash value entry stored in a pre-loaded hash table,
   determine whether the unmarked entities satisfy a plurality of matching rules, and output the unmarked entities of the plurality of entities that satisfy at least one of the matching rules.

7. The system of claim 6, wherein the fingerprinting based entity extraction comprises scanning the input data string to extract the unmarked entities by checking pre-indexed entity records.

8. The system of claim 6, wherein the pre-loaded hash table is constructed by dividing each entity value into a plurality of parts and calculating a hash value entry for at least two of the plurality of part.

9. The system of claim 6, wherein the hash value is calculated using a Karp-Rabin hash function.

10. The system of claim 6, wherein said entities comprise sensitive information being protected by an information leakage and detection system.

11. A non-transitory computer readable tangible medium storing instructions thereon, the instructions executable by one more processors and causing the one or more processors to:
  receive an input data string having a plurality of entities,
  determine entities to be marked based on regular expression by sliding a window across the input data string;
  apply the regular expression to text in the window;
  mark the entities of the plurality of entities based on matching rules for the regular expression;
  transmit the input data string with the marked entities to a second tier entity recognition engine;
  identify unmarked entities in the received input data string with the marked entities by using a fingerprinting based entity extraction process, wherein the fingerprinting based entity extraction process comprises sliding a window and determining if a hash value computed from a portion of the input data string isolated by the window matches a hash value entry stored in a pre-loaded hash table, determine whether the unmarked entities satisfy a plurality of matching rules, and output the unmarked entities of the plurality of entities that satisfy at least one of the matching rules.

12. The computer readable tangible medium of claim 11, wherein the fingerprinting based entity extraction comprises scanning the input data string to extract the unmarked entities by checking pre-indexed entity records.

13. The computer readable tangible medium of claim 11, wherein the pre-loaded hash table is constructed by dividing each entity value into a plurality of parts and calculating a hash value entry for at least two of the plurality of part.

14. The computer readable tangible medium of claim 11, wherein the hash value is calculated using a Karp-Rabin hash function.

15. The computer readable tangible medium of claim 11, wherein said entities comprise sensitive information being protected by an information leakage and detection system.

* * * * *